US007747336B2

(12) United States Patent
Maeda et al.

(10) Patent No.: US 7,747,336 B2
(45) Date of Patent: Jun. 29, 2010

(54) APPARATUS FOR CREATING A TURNING PROGRAM

(75) Inventors: Hideaki Maeda, Yamanashi (JP);
Shinya Nakamura, Yamanashi (JP);
Akira Horiuchi, Fujiyoshida (JP)

(73) Assignee: FANUC Ltd., Yamanashi (JP)

( * ) Notice: Subject to any disclaimer, the term of this patent is extended or adjusted under 35 U.S.C. 154(b) by 190 days.

(21) Appl. No.: 11/902,201

(22) Filed: Sep. 19, 2007

(65) Prior Publication Data
US 2008/0086230 A1 Apr. 10, 2008

(30) Foreign Application Priority Data
Oct. 5, 2006 (JP) .............. 2006-274173

(51) Int. Cl.
*G05B 19/4093* (2006.01)
(52) U.S. Cl. ............... 700/86; 700/173; 700/188; 318/568.15; 409/132; 451/21
(58) Field of Classification Search ............ 700/86, 700/173, 188; 318/568.15; 409/132; 451/21
See application file for complete search history.

(56) References Cited

U.S. PATENT DOCUMENTS 5,107,414 A * 4/1992 Fukaya et al. .......... 700/86

5,272,622 A * 12/1993 Mizukami ............... 700/86
5,406,494 A * 4/1995 Schuett .................. 700/188
5,660,579 A * 8/1997 Nakayama et al. ......... 451/21
5,920,170 A * 7/1999 Seki et al. ............ 318/568.15
2006/0291969 A1* 12/2006 Koch .................... 409/132

FOREIGN PATENT DOCUMENTS

JP 2-145237 6/1990
JP 4-199308 7/1992

OTHER PUBLICATIONS

Japanese Office Action for corresponding Japanese Application 2006-274173; mailed Oct. 7, 2008.

* cited by examiner

*Primary Examiner*—Albert DeCady
*Assistant Examiner*—Douglas S Lee
(74) *Attorney, Agent, or Firm*—Staas & Halsey LLP

(57) ABSTRACT

One element is taken from a machined shape. When the element is a straight line element, whether or not the distance D between the start point and the end point of the element in a direction orthogonal to the axis of rotation of the workpiece is equal to or greater than a preset value Ds is determined. In addition, whether or not an angle A that the straight line element makes with the Z-axis is equal to or greater than a preset angle Aa is determined. When the distance D is equal to or greater than the preset value Ds and the angle A is equal to or greater than the preset angle Aa, a program is created with the cutting direction reversed from the profile direction.

6 Claims, 3 Drawing Sheets

APPARATUS FOR CREATING A TURNING PROGRAM

BACKGROUND OF THE INVENTION

1. Field of the Invention

The present invention relates to an apparatus for creating a turning program used by a lathe or other machine tool.

2. Description of the Related Art

There are known numerical controllers or automatic programming apparatuses that automatically create a machining program from input information such as the shape of the material to be turned and the machined shape (final shape). When a machining program is automatically created in such a way, the material shape and machined shape are interactively defined and input by arcs and straight lines, as instructed by on-screen guidance, and the tool and machining conditions are selected and determined automatically.

When a machining program for finish turning (including semifinish turning) is automatically created in an interactive manner, the cutting direction is generally set to follow the profile of the machined shape.

However, depending on the shape of the cutting tool, the cutting performance and finish accuracy may vary with the cutting direction or chips may need to be disposed of properly, so in some situations, cutting may proceed from the rim toward the center of the workpiece instead of following the machined profile.

For example, Japanese Patent Application Laid-Open NO. 2-145237 discloses a contour shape machining method, which specifies the cutting direction for each element of the machined shape to suit the tool shape.

To select and set the optimum cutting direction for finish machining (including semi-finish machining), the cutting direction needs to be set for each element of the machined shape, as described in the above patent document. Therefore, it is difficult for a non-skilled operator to select and set the optimum cutting direction, taking the cutting efficiency and accuracy into account. In addition, creating a machining program by setting the cutting direction for each machining element is time-consuming and troublesome.

SUMMARY OF THE INVENTION

An object of the present invention is to provide a turning program creation apparatus that can automatically determine cutting directions while creating a machining program for finish machining, including semi-finish machining, and create a finish machining program with high machining accuracy.

The inventive turning program creation apparatus for creating a program for finish machining comprises a machining element identification means for identifying a machining element from machined shape data, a cutting direction determination means for automatically determining the direction in which to cut the workpiece on the basis of features of the machining element identified by the machining element identification means, and a program creation means for creating a turning program in which the direction determined by the cutting direction determination means is set.

When the machining element identified by the machining element identification means from the machined shape data is a straight line element, the cutting direction determination means compares an angle that the straight line element makes with the axis of rotation of the workpiece with a preset angle and, if the angle made by the straight line element is greater than the preset angle, can change the cutting direction from the profile direction to a direction from the rim toward the center of the workpiece.

When the machining element identified by the machining element identification means from the machined shape data is a straight line element, the cutting direction determination means obtains the distance between the start point and the end point of the straight line element in the direction orthogonal to the axis of rotation of the workpiece, compares the obtained distance with a preset value, and, if the distance is greater than the preset value, can change the cutting direction from the profile direction to the direction from the rim toward the center of the workpiece.

When the machining element identified by the machining element identification means from the machined shape data is an arc element, the cutting direction determination means compares an angle that a straight line between the start point and the end point of the arc element makes with the axis of rotation of the workpiece with a preset angle and, if the angle made by the arc element is greater than the preset angle, can change the cutting direction from the profile direction to the direction from the rim toward the center of the workpiece.

When the machining element identified by the machining element identification means from the machined shape data is an arc element, the cutting direction determination means compares the radius of the arc element with a preset value and, if the radius is greater than the preset value, can change the cutting direction from the profile direction to the direction from the rim toward the center of the workpiece.

When the machining element identified by the machining element identification means from machined shape data is a straight line element, if the angle that the straight line element makes with the axis of rotation of the workpiece is greater than a preset angle and the distance between the start point and the end point of the straight line element in the direction orthogonal to the axis of rotation of the workpiece is greater than a preset distance, the cutting direction determination means can change the cutting direction from the profile direction to the direction from the rim toward the center of the workpiece.

When the machining element identified by the machining element identification means from machined shape data is an arc element, if the angle that a straight line between the start point and the end point of the arc element makes with the axis of rotation of the workpiece is greater than a preset value and the radius of the arc element is greater than a preset value, the cutting direction determination means can change the cutting direction from the profile direction to the direction from the rim toward the center of the workpiece.

According to the present invention, when a machining program for finish machining is created, when machining accuracy would be reduced because of tensile stress applied to the tool, the cutting direction is automatically set to the push cut direction, opposite to the profile direction. Accordingly, if a machining program is created in this way, finish turning can be performed without reduction of machining accuracy.

BRIEF DESCRIPTION OF THE DRAWINGS

The above and other objectives and features of the present invention will become apparent from the following description of preferred embodiments thereof with reference to the accompanying drawings, in which.

DETAILED DESCRIPTION OF THE PREFERRED EMBODIMENTS

First, the principle of the present invention will be described with reference to FIGS. 1A to 1D.

When tensile stress is applied to a tool during machining in the draw cut direction, machining accuracy may be reduced. To address this problem, the cutting direction needs to be reversed to the push cut direction to prevent the reduction of machining accuracy.

Accordingly, this invention creates a machining program that automatically selects the cutting direction depending on the machined shape during finish cutting to prevent reduction of machining accuracy.

The cutting direction is determined as described below. In FIGS. 1A to 1D, a workpiece 1 is mounted on the spindle of a lathe; the direction of the axis of rotation of the workpiece 1 (the horizontal direction in FIGS. 1A to 1D) is the Z-axis direction and the direction (the vertical direction in FIGS. 1A to 1D) orthogonal to the Z-axis direction is the X-axis direction.

Figure 1A:
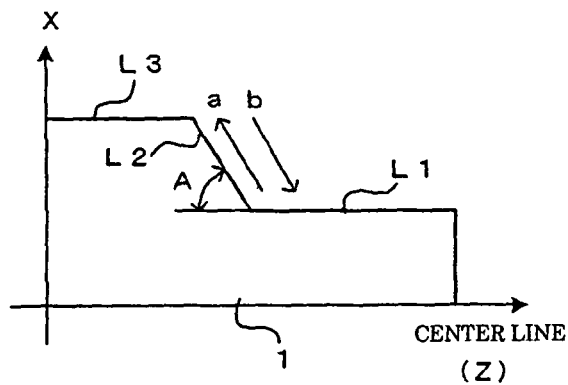
FIG. 1A indicates, when a machining element is a straight line, how the cutting direction is set to the profile direction or the opposite direction depending on the slant angle A of the straight line.

(1) When an element of the machined shape is a straight line and the cutting direction is determined depending on the angle that the straight line makes with the Z-axis (see FIG. 1A)

In FIG. 1A, element L2 of the shape to be machined is a straight line that makes an angle A with the axis of rotation (Z-axis) of the workpiece.

In this case, when the angle A (the slant angle of the straight line element L2) is large, the stress applied to the tool in the draw cut direction would be likely to reduce the machining accuracy. Accordingly, when the slant angle A is equal to or greater than a preset angle, the cutting direction is reversed to prevent machining accuracy from being reduced by the stress in the draw cut direction. As described below, the minimum angle Aa, at which the machining accuracy is reduced is found in advance, and if the slant angle A of the straight line element L2 is less than the lower limit angle Aa (preset angle Aa), the cutting direction is left as the preset direction "a" that traces the machined profile. When the slant angle A of the straight line element L2 is equal to or greater than the minimum angle Aa and there is a chance that machining accuracy may be reduced, the cutting direction is reversed from the normal direction "a" to the direction "b" (the push cut direction) that moves the tool from the rim toward the center of the workpiece to preserve machining accuracy. The cutting direction is determined as follows:

Slant angle A of the straight line element<Preset angle Aa ⇒ Direction "a" that traces the machined profile.

Slant angle A of the straight line element≧Preset angle Aa ⇒ Direction "b" from the rim toward the center of the workpiece.

Figure 1B:
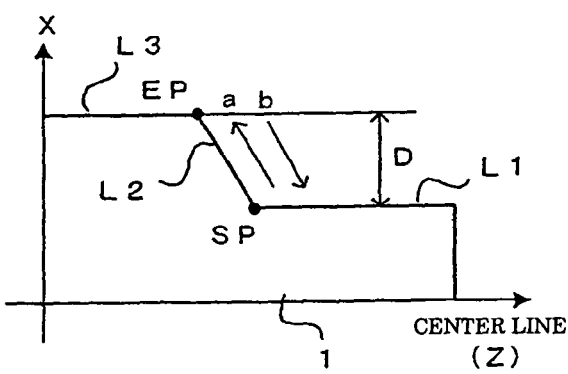
FIG. 1B indicates, when the machining element is a straight line, how the cutting direction is set to the profile direction or the opposite direction depending on the vertical distance D of the straight line.

(2) When the element of the machined shape is a straight line and the cutting direction is determined depending on the distance D between the start point and the end point of the straight line in the X-axis direction (see FIG. 1B.)

The start point and the end point of the straight line element L2 are SP and EP, respectively, and the distance (vertical difference) between the start point SP and the end point EP in the X-axis direction is D.

When the vertical difference D of the straight element L2 is less than a preset value Ds, that is, when the height of the slanting straight line element L2 is less than Ds, the cutting direction is set to the direction "a" that traces the machined profile because the stress applied to the tool in the draw cut direction is small. When the vertical difference D is greater than the preset value Ds, the cutting direction is reversed from the normal direction, and the tool is moved in the direction "b" from the rim toward the center of the workpiece. The cutting direction is determined as follows:

Vertical difference D of the straight line element<Preset value Ds ⇒ Direction "a" that traces the machined profile.

Vertical difference D of straight line element≧Preset value Ds ⇒ Direction "b" from the rim toward the center of the workpiece.

Figure 1C:
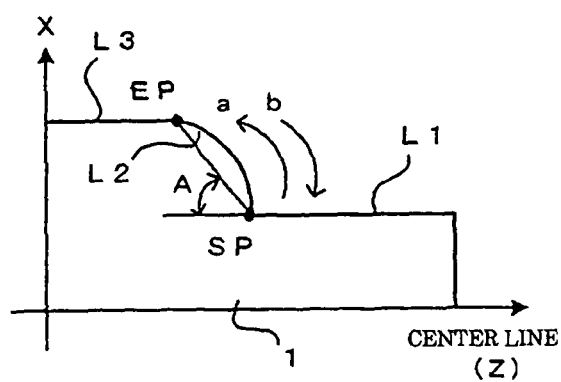
FIG. 1C indicates, when the machining element is an arc, how the cutting direction is set to the profile direction or the opposite direction depending on the slant angle A of the chord of the arc.

(3) When the element of the machined shape is an arc and the cutting direction is determined depending on the angle that the straight line between the start point and the end point of the arc makes with the Z-axis (see FIG. 1C.)

The start point and the end point of the arc element L2 are SP and EP, respectively; when the angle A (slant angle of the chord of the arc element L2) that the straight line (chord) between the start point SP and the end point EP makes with the axis of rotation (Z-axis) of the workpiece is less than a preset angle Ab, the cutting direction is left at the preset direction "a" that traces the machined profile. When the angle A is equal to or greater than the preset angle Ab and there is a chance that machining accuracy may be reduced, the cutting direction is reversed from the normal direction to the direction "b" from the rim toward the center of the workpiece, so that the tool is moved in the push cut direction. The cutting direction is determined as follows:

Slant angle A of the chord of the arc element<Preset angle Ab ⇒ Direction "a" that traces the machined profile.

Slant angle A of the chord of the arc element≧Preset angle Ab ⇒ Direction "b" from the rim toward the center of the workpiece.

Figure 1D:
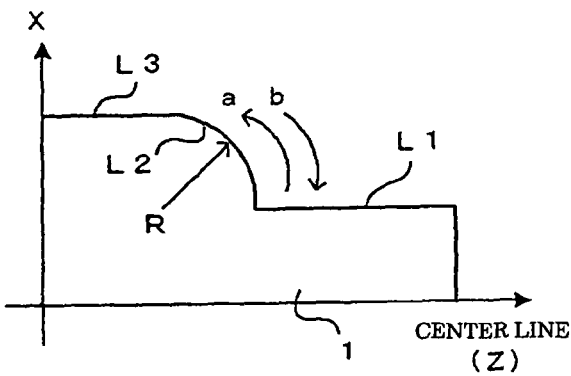
FIG. 1D indicates, when the machining element is an arc, how the cutting direction is set to the profile direction or the opposite direction depending on the radius R of the arc.

(4) When the element of the machined shape is an arc and the cutting direction is determined depending on the radius R of the arc (see FIG. 1D.)

When the radius R of the arc element is less than a preset value Rs, the cutting direction is set to the direction "a" that traces the machined profile because the stress applied to the tool in the draw cut direction is small. When the radius R is equal to or greater than the preset value Rs, the cutting direction is reversed from the normal direction to the direction "b" from the rim toward the center of the workpiece. The cutting direction is determined as follows:

Radius R of the arc element<Preset value Rs ⇒ Direction "a" that traces the machined shape.

Radius R of the arc element≧Preset value Rs ⇒ Direction "b" from the rim toward the center of the workpiece.

Figure 2:
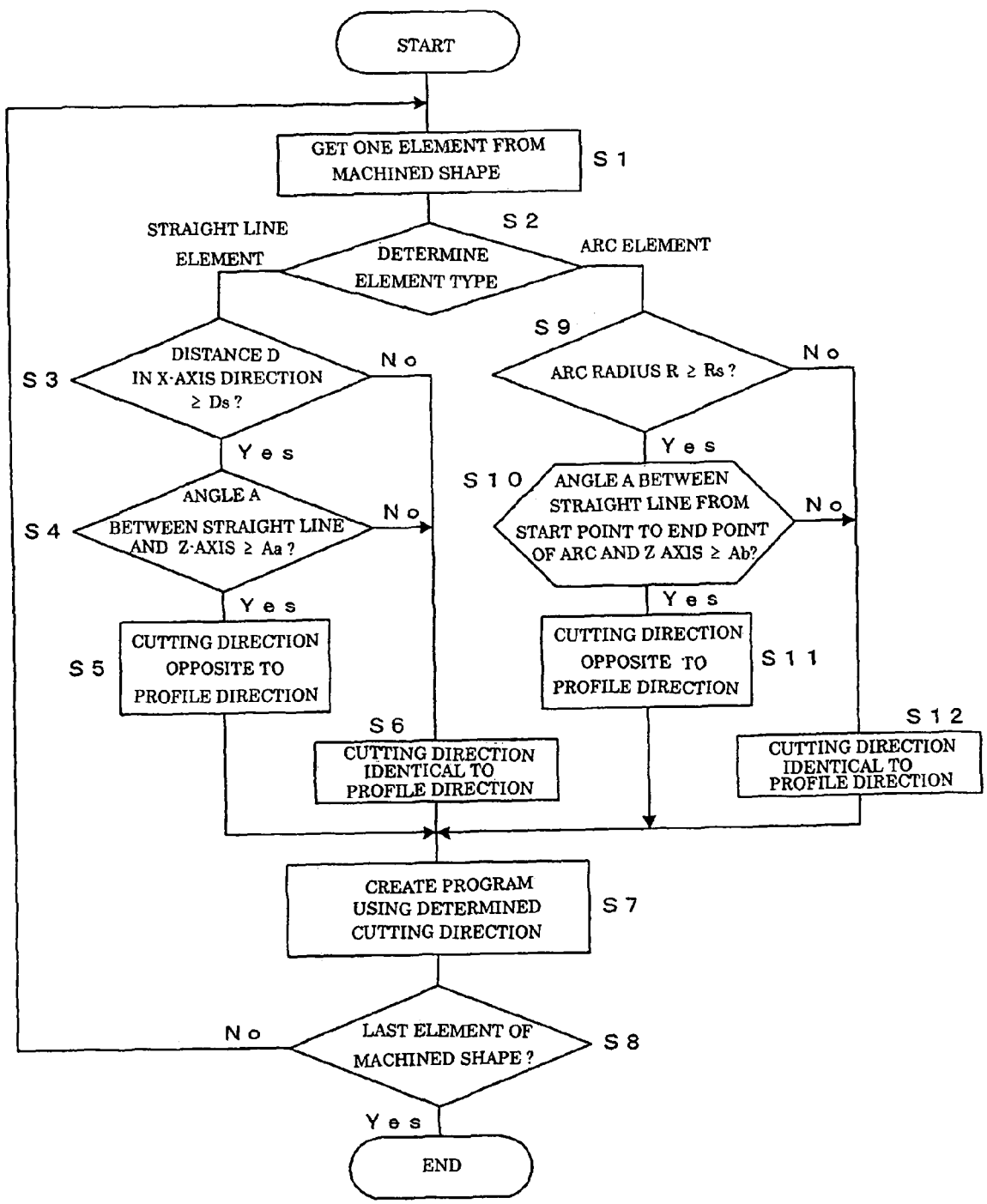
FIG. 2 is a flowchart showing an algorithm for a cutting direction automatic determination process executed by an embodiment of a turning program creation apparatus according to the present invention.

FIG. 2 is a flowchart showing an algorithm for a cutting direction automatic determination process in a machining program creation process, executed by an embodiment of a turning program creation apparatus according to the present invention. The program creation apparatus according to the present invention may be configured as a numerical controller incorporating software for creating a machining program including the cutting direction automatic determination process, an automatic programming apparatus, or a personal computer in which software for creating a machining program, including the cutting direction automatic determination process, is installed.

Figure 3:
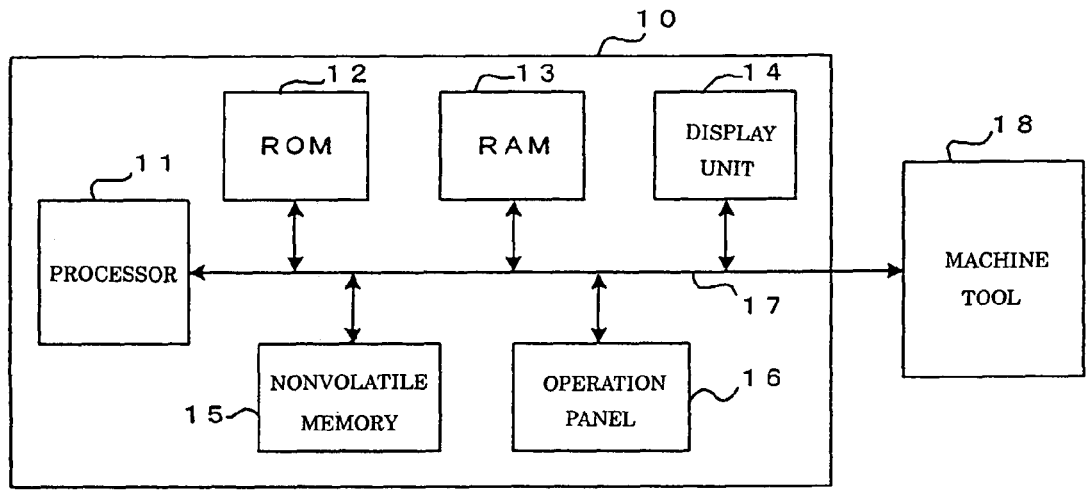
FIG. 3 is a block diagram showing principal parts of a numerical controller constituting a turning program creation apparatus according to the present invention.

FIG. 3 is a block diagram showing the principal parts of a numerical controller constituting the turning program creation apparatus.

The numerical controller 10 comprises a processor 11 as well as a ROM 12, a RAM 13, a display unit 14, a nonvolatile memory 15, an operation panel 16, and so on that are connected to the processor 11 through a bus 17, as in conventional numerical controllers. Numerical controller 10 is connected to a machining tool 18 to be controlled. Machining program creation software is stored in nonvolatile memory 15. To create a machining program interactively using numerical controller 10, the operator loads the machining program creation software stored in nonvolatile memory 15 into RAM 13 and operates display unit 14 and operation panel 16 in the customary manner.

Figure 4:
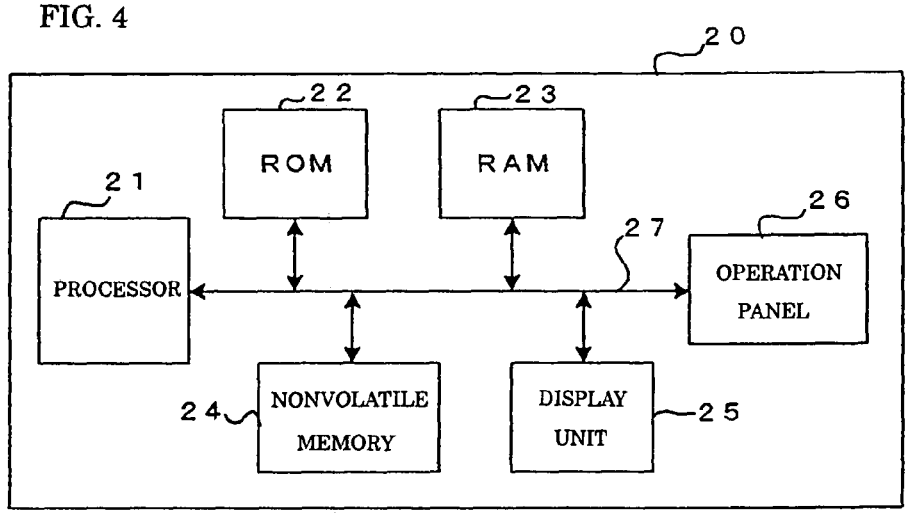
FIG. 4 is a block diagram showing principal parts of an interactive automatic programming apparatus constituting a turning program creation apparatus according to the present invention.

FIG. 4 is a block diagram showing the principal parts of an interactive automatic programming apparatus constituting the turning program creation apparatus.

The interactive automatic programming apparatus 20 comprises a processor 21 as well as a ROM 22, a RAM 23, a nonvolatile memory 24, a display unit 25, an operation panel 26, and so on, which are connected to processor 21 through a bus 27, as in conventional automatic interactive programming apparatuses. To create a machining program interactively using the interactive automatic programming apparatus 20, an operator loads machining program creation software stored in nonvolatile memory 24 into RAM 23 and operates display unit 25 and operation panel 26 in the customary manner.

Figure 5:
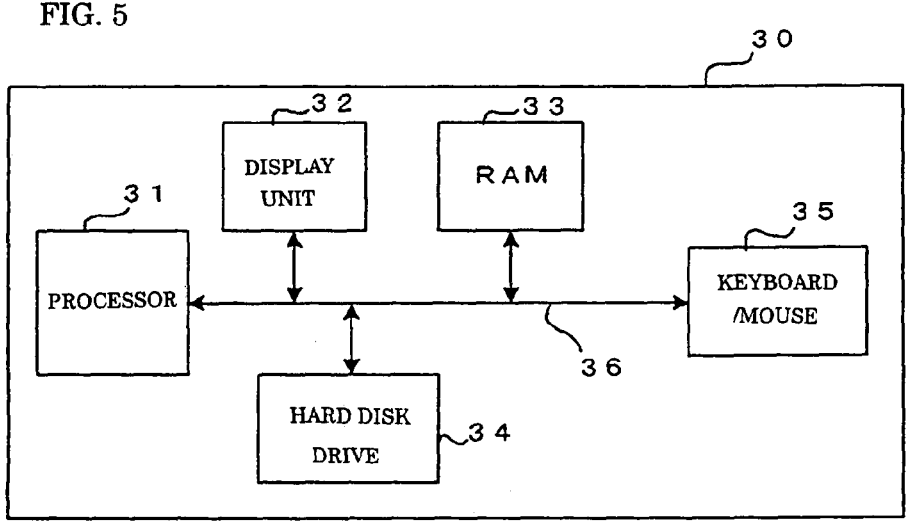
FIG. 5 is a block diagram showing principal parts of a personal computer constituting a turning program creation apparatus according to the present invention.

FIG. 5 is a block diagram showing principal parts of a personal computer constituting the turning program creation apparatus.

The personal computer 30 comprises a processor 31 as well as a display unit 32, a RAM 33, a hard disk drive 34, a keyboard/mouse 35, and so on, which are connected to the processor 31 through a bus 36, as in conventional personal computers. An operator creates a machining program interactively using the display unit 32 and the keyboard/mouse 35 according to the machining program creation software stored in the hard disk drive 34 of personal computer 30 in the customary manner.

The flowchart in FIG. 2 shows the cutting direction automatic determination process in the machining program creation process, executed by the processor in the device that constitutes the above turning program creation apparatus: processor 11 in numerical controller 10, processor 21 in interactive automatic programming apparatus 20, or processor 31 in personal computer 30.

First, one element is taken from entered machined shape data (step S1) and whether the element is a straight line element or arc element is determined (step S2). If the element is a straight line element, the distance D (vertical difference) between its start point SP and end point EP in the X-axis direction is obtained and whether or not the distance D is equal to or greater than a preset value Ds is determined (step S3). This is equivalent to the determination process in (2) above, which is based on the distance D in the X-axis direction for a straight line element.

When the distance D (vertical difference) obtained in this determination process is less than the preset value Ds (step S3, determination result "No"), the cutting direction is set to the preset profile direction "a" (step S6) and the machining program is created as usual with this cutting direction (step S7).

When the distance D (vertical difference) is equal to or greater than the preset value Ds (step S3, determination result "Yes"), the angle A that the straight line element makes with the axis of rotation (Z-axis) of the workpiece is obtained and whether or not the angle A is equal to or greater than a preset angle Aa is determined (step S4). This is equivalent to the determination process in (1) above, in which the cutting direction is determined based on the angle A that the straight line element makes with the axis of rotation (Z-axis) of the workpiece. When the angle A obtained in this determination process is less than the preset angle Aa, the processing proceeds to step S6 and the cutting direction is set to the profile direction "a". When the angle A that the straight line element makes with the axis of rotation (Z-axis) of the workpiece is equal to or greater than the preset angle Aa, the cutting direction is set to the direction "b" from the rim toward the center of the workpiece, which is opposite to the profile direction "a" (step S5), the processing proceeds to step S7 and the machining program is created.

Next, whether the last element of the machined shape has been reached or not is determined (step S8) and, if it has not been reached, the processing returns to step S1.

If the element taken from the machined shape data is determined to be an arc element in step S2, the processing shifts from step S2 to step S9 and whether or not the radius R of the arc element is equal to or greater than a preset value Rs is determined. This is equivalent to the determination process in (4) above, in which the cutting direction is determined based on the radius R of the arc element.

When the radius R obtained in this determination process is less than the preset value Rs (step S9, determination result "No"), the cutting direction is set to the preset profile direction "a" (step S12), the processing proceeds to step S7, and the machining program is created with this cutting direction. When the radius R obtained is equal to or greater than the preset value Rs (step S9, determination result "Yes"), on the other hand, the angle A that the straight line (chord) between the start point SP and the end point EP of the arc makes with the axis of rotation (Z-axis) of the workpiece is obtained and whether or not the angle A (slant angle of the chord) is equal to or greater than the preset angle Ab is determined (step S10). This is equivalent to the determination process in (3) above, in which the cutting direction is determined based on the angle that the straight line between the start point and end point of the arc element makes with the Z-axis.

When the angle A (slant angle of the chord) obtained in this determination process is less than the preset angle Ab, the cutting direction is set to the profile direction "a" (step S12)

and the machining program is created with the cutting direction "a" (step S7). When the angle A obtained is equal to or greater than the preset angle Ab, on the other hand, the cutting direction is set to the direction "b" from the rim toward the center of the workpiece (step S11), which is opposite to the profile direction, and the machining program is created with the cutting direction "b" (step S7).

Next, whether the last element of the machined shape has been reached or not is determined (step S8) and, if it has not been reached, the processing returns to step S1. The above procedure is then repeated to determine cutting directions for the entered machining shape, thereby automatically creating a machining program. If it is determined in step S8 that the last element of the machined shape has been reached, the process of creating the machining program is completed.

In the machining program creation process shown in FIG. 2, if the machining element is a straight line element, the cutting direction is set to the direction "b" opposite to the profile direction "a" only when the distance D (vertical difference) of the straight line element in the X-axis direction is equal to or greater than the preset value Ds and the angle A (slang angle of the straight line element) that the straight line element makes with the axis of rotation (Z-axis) of the workpiece is equal to or greater than the preset angle Aa, that is, only when the condition D≧Ds AND A≧Aa is satisfied. This is because, when the distance D of the straight line element in the X-axis direction is large and the angle A that the straight line element makes with the axis of rotation (Z-axis) of the workpiece is large, the stress that would be applied to the tool in the draw cut direction would be applied over a long distance, and would be likely to reduce the machining accuracy. When the distance D (vertical difference) of the straight line element in the X-axis direction is large but the angle A (slant angle) which the straight line element makes with the axis of rotation (Z-axis) of the workpiece is less than the preset angle Aa, on the other hand, the stress applied to the tool in the draw cut direction is too small to reduce the machining accuracy. Therefore, the cutting direction is not changed and the normal direction (profile direction "a") is used, as shown in the flowchart (step S3—step S4—step S6) of FIG. 2.

Similarly, if the machining element is an arc, the cutting direction is set to the direction "b" opposite to the profile direction "a" only when the radius R of the arc is greater than the preset value Rs and the angle A that the straight line between the start point and end point of the arc makes with the axis of rotation (Z-axis) of the workpiece is equal to or greater than the preset angle Ab, that is, only when the condition R≧Rs AND A≧Ab is satisfied. When the radius R of the arc is greater than the preset value Rs but the angle A that the straight line (chord) between the start point and the end point of the arc makes with the axis of rotation (Z-axis) of the workpiece is less than the preset angle Ab, on the other hand, the stress applied to the tool in the draw cut direction is too small to reduce the machining accuracy. Therefore, the cutting direction is not changed and the normal direction (profile direction "a") is used, as shown in the flowchart (step S9—step S10—step S12) in FIG. 2.

Alternatively, the cutting direction can be determined independently according to the results of determination processes (1) to (4). In other words, when the machining element is a straight line, whether or not the distance D in the X-axis direction is equal to or greater than the preset value Ds and whether or not the angle A that the straight line element makes with the axis of rotation (Z-axis) of the workpiece is greater than the preset angle Aa are determined, and with these determination results, the cutting direction may be set to direction "b" if either the condition D≧Ds or the condition A≧Aa is satisfied, and the cutting direction may be set to the profile direction "a" only when the condition D<Ds AND A<Aa is satisfied. In this case, the processing in FIG. 2 is changed so that, if step S3 produces a Yes result, the processing proceeds to step S5 or, if it produces a No result, the processing proceeds to step S4.

When the machining element is an arc, whether or not the radius R of the arc is equal to or greater than the preset value Rs and whether or not the angle A that the straight line (chord) between the start point and end point of the arc makes with the axis of rotation (Z-axis) of the workpiece is equal to or greater than the preset angle Ab are determined, and with these determination results, the cutting direction may be set to direction "b" if either the condition R≧Rs or the condition A≧Ab is satisfied, and the cutting direction may be set to the profile direction "a" only if the condition R<Rs AND A<Ab is satisfied. In this case, the processing in FIG. 2 is changed so that, if step S9 produces a Yes result, the processing proceeds to step S11 or, if it produces a No result, the processing proceeds to step S10.

In addition, when the machining element is a straight line, the cutting direction may be determined according only to whether or not the distance D of the straight line in the X-axis direction is equal to or greater than the preset value Ds. Alternatively, the cutting direction may be determined on the basis only of whether or not the angle A that the straight line makes with the axis of rotation (Z-axis) of the workpiece is equal to or greater than the preset angle Aa.

Similarly, when the machining element is an arc, the cutting direction may be determined according only to whether or not the radius R of the arc is greater than the preset value Rs. Alternatively, the cutting direction may be determined according only to whether or not the angle A that the straight line (chord) between the start point and end point of the arc makes with the axis of rotation (Z-axis) of the workpiece is equal to or greater than the preset angle Ab.

That is, when the machining element is a straight line, if the distance D of the straight line in the X-axis direction is equal to or greater than the preset value Ds, the cutting direction may be set to the direction "b" opposite to the profile direction "a"; if the distance D is less than the preset value Ds, the cutting direction may be set to the profile direction "a". Alternatively, if the angle A that the straight line makes with the axis of rotation (Z-axis) of the workpiece is equal to or greater than the preset angle Aa, the cutting direction may be set to the direction "b" opposite to the profile direction "a"; if the angle A is less than the preset angle Aa, the cutting direction may be set to the profile direction "a".

Similarly, when the machining element is an arc, if the radius R of the arc is equal to or greater than the preset value Rs, the cutting direction may be set to the direction "b" opposite to the profile direction "a"; if the radius R is less than the preset value Rs, the cutting direction may be set to the profile direction "a". Alternatively, when the angle A that the straight line (chord) between the start point and end point of the arc makes with the axis of rotation (Z-axis) of the workpiece is equal to or greater than the preset angle Ab, the cutting direction may be set to the direction "b" opposite to the profile direction "a"; when the angle A is less than the preset angle Ab, the cutting direction may be set to the profile direction a.

The method of automatically determining the cutting direction may be selected depending on the target machining accuracy, workpiece material, or tool characteristics.

The invention claimed is:

1. A turning program creation apparatus for creating a finish machining program, comprising:

a machining element identification means for identifying a machining element from machined shape data;

a cutting direction determination means for automatically determining a direction in which to cut a workpiece on the basis of a feature of the machining element identified by the machining element identification means; and a program creation means for creating a machining program that cuts in the direction determined by the cutting direction determination means, wherein when the machining element identified by the machining element identification means from the machined shape data is a straight line element, the cutting direction determination means compares an angle that the straight line element makes with an axis of rotation of the workpiece with a preset angle and, if the angle made by the straight line element is greater than the preset value, changes the cutting direction from a profile direction to a direction from a rim toward a center of the workpiece.

2. A turning program creation apparatus for creating a finish machining program, comprising:

a machining element identification means for identifying a machining element from machined shape data;

a cutting direction determination means for automatically determining a direction in which to cut a workpiece on the basis of a feature of the machining element identified by the machining element identification means; and a program creation means for creating a machining program that cuts in the direction determined by the cutting direction determination means, wherein when the machining element identified by the machining element identification means from the machined shape data is a straight line element, the cutting direction determination means obtains a distance between a start point and an end point of the straight line element in a direction orthogonal to an axis of rotation of the workpiece, compares the obtained distance with a preset value, and, if the distance is greater than the preset value, changes the cutting direction from a profile direction to a direction from a rim toward a center of the workpiece.

3. A turning program creation apparatus for creating a finish machining program, comprising:

a machining element identification means for identifying a machining element from machined shape data;

a cutting direction determination means for automatically determining a direction in which to cut a workpiece on the basis of a feature of the machining element identified by the machining element identification means; and a program creation means for creating a machining program that cuts in the direction determined by the cutting direction determination means, wherein when the machining element identified by the machining element identification means from the machined shape data is an arc element, the cutting direction determination means compares an angle that a straight line between a start point and an end point of the arc element makes with an axis of rotation of the workpiece with a preset angle and, if the angle made by the arc element is greater than the preset angle, changes the cutting direction from a profile direction to a direction from a rim toward a center of the workpiece.

4. A turning program creation apparatus for creating a finish machining program, comprising:

a machining element identification means for identifying a machining element from machined shape data;

a cutting direction determination means for automatically determining a direction in which to cut a workpiece on the basis of a feature of the machining element identified by the machining element identification means; and a program creation means for creating a machining program that cuts in the direction determined by the cutting direction determination means, wherein when the machining element identified by the machining element identification means from the machined shape data is an arc element, the cutting direction determination means compares a radius of the arc element with a preset value and, if the radius is greater than the preset value, changes the cutting direction from a profile direction to a direction from a rim toward a center of the workpiece.

5. A turning program creation apparatus for creating a finish machining program, comprising:

a machining element identification means for identifying a machining element from machined shape data;

a cutting direction determination means for automatically determining a direction in which to cut a workpiece on the basis of a feature of the machining element identified by the machining element identification means; and a program creation means for creating a machining program that cuts in the direction determined by the cutting direction determination means, wherein when the machining element identified by the machining element identification means from the machined shape data is a straight line element, if an angle that the straight line element makes with a axis of rotation of the workpiece is greater than a preset angle and a distance between a start point and an end point of the straight line element in a direction orthogonal to an axis of rotation of the workpiece is greater than a preset distance, the cutting direction determination means changes the cutting direction from a profile direction to a direction from a rim toward a center of the workpiece.

6. A turning program creation apparatus for creating a finish machining program, comprising:

a machining element identification means for identifying a machining element from machined shape data;

a cutting direction determination means for automatically determining a direction in which to cut a workpiece on the basis of a feature of the machining element identified by the machining element identification means; and a program creation means for creating a machining program that cuts in the direction determined by the cutting direction determination means, wherein when a machining element identified by the machining element identification means from the machined shape data is an arc element, if an angle that a straight line between a start point and an end point of the arc element makes with an axis of rotation of the workpiece is greater than a preset angle and a radius of the arc element is greater than a preset value, the cutting direction determination means changes the cutting direction from a profile direction to a direction from a rim toward a center of the workpiece.

* * * * *